United States Patent [19]

Hunt et al.

[11] 3,901,878

[45] Aug. 26, 1975

[54] ACID TREATED CATIONIC STARCH IN THE FLOCCULATION AND DEWATERING OF SLUDGE

[75] Inventors: Walter G. Hunt, Bridgeton; Ray J. Belz, Mehlville, both of Mo.

[73] Assignee: Anheuser-Busch, Incorporated, St. Louis, Mo.

[22] Filed: Jan. 21, 1974

[21] Appl. No.: 434,998

[52] U.S. Cl............ 260/233.3 R; 210/10; 260/233.5
[51] Int. Cl.²......................................... C08B 31/12
[58] Field of Search................... 260/233.3 R, 233.5

[56] References Cited
UNITED STATES PATENTS

| | | | |
|---|---|---|---|
| 3,622,563 | 11/1971 | Elizer | 260/233.3 R |
| 3,624,070 | 11/1971 | Hunt | 260/233.3 R |

*Primary Examiner*—Melvyn I. Marquis
*Attorney, Agent, or Firm*—Gravely, Lieder & Woodruff

[57] ABSTRACT

This disclosure covers the use of an acid treated, high fluidity, high degree of substitution, waxy maize cationic starch in the flocculation and dewatering of municipal raw primary sludge. From 0.007 to 0.200% (based on the dry weight of the sludge) of the treated starch of about 30 to about 50 fluidity is added to raw primary municipal sludge and contacted with the sewage before the mixture is dewatered to a moisture content below about 70% moisture, which is the moisture level at which the solids will adequately sustain combustion. The starch has from about 0.15 to about 0.25 degree of substitution of an amine butene halide, specifically, 4-chloro-2-butenyl-trimethylammonium chloride.

6 Claims, No Drawings

ACID TREATED CATIONIC STARCH IN THE FLOCCULATION AND DEWATERING OF SLUDGE

BACKGROUND OF THE INVENTION

The problem of separating particles from suspensions is encountered in many industries. In the treatment of raw primary sewage it is frequently the practice to employ a coagulant to flocculate the sludge or solids in a settling basin so that the sludge may be filtered, preferably with a rotary drum vacuum filter. The effluent from the settling tank and water from filtration can be further treated in a secondary treatment process. The filter cake is usually incinerated or otherwise disposed of. For the cake to be incinerated, it is necessary for it to have at least 30% solids to sustain combustion. Some of the chemical coagulants presently utilized in the treatment of raw primary sludge prior to vacuum filtration are lime, ferric chloride, and certain acrylic-type polymers.

Starch, because of its availability and low cost, is used as a flocculating agent in the mining and paper industries. It can also be utilized as a sludge flocculant, although it must be modified to be effective to solve some of the problems of sewage treatment. The starch is treated so as to be positively charged which causes the sludge to flocculate. The sludge is negatively charged and can be flocculated using the cationic starch product of this invention. However, an anionic polymer usually is added to the sludge before the cationic starch polymer is added to improve the flocculation efficiency.

Flocculation is believed to result from one or more of three general mechanisms, namely: a neutralization of the particles; secondly, adsorption of long chain polymers on the surface of the solid particles which form large agglomerates; and thirdly, entrapment of the particles by the formation of a large floc.

In co-pending application, Ser. No. 335,518, filed Feb. 26, 1973 and now U.S. Pat. No. 3,835,114 a process is described for preparing a quaternary ammonium alkene halide ether of oxidized starch to be used as a flocculating agent. Hunt U.S. Pat. No. 3,624,070 (owned by the assignee of this invention) teaches the preparation of granular gelatinizable quaternary ammonium starch ethers from starch and an amine alkene halide.

In both application Ser. No. 335,518 filed Feb. 26, 1973 and now U.S. Pat. No. 3,835,114 and the present invention, the modified starches are gelatinized prior to the reaction with the amine alkene halide so that a more random-type of substitution is obtained which increases the flocculating effect of the starch ether.

Application Ser. No. 335,518 filed Feb. 26, 1973 and now U.S. Pat. No. 3,835,114 teaches the use of an oxidized gelatinized cationic starch as a flocculating agent. The starch used is preferably dent corn starch, but other non-waxy starches such as wheat, potato, sago, and rice can be used. The present invention teaches the use of an acid treated waxy maize cationic starch as a flocculating agent. The starch used is preferably waxy maize starch, but any waxy variety or any type having the same characteristics can be used. This product is competitive with other commercial cationic polyelectrolyte flocculation agents in performance and is more economical than most. The primary object of this invention is to provide a process for the preparation of cationic amine alkene halide ethers of acid treated, waxy maize starch of unusually high flocculating capacity. A further object is to prepare a new and useful flocculating agent in the treatment of primary sewage sludge in a simple and economical manner. Another object is to produce a flocculating agent that will flocculate most types of sludges and handle the daily varying characteristics of the sludge without becoming totally ineffective. These and other objects and advantages will become apparent hereinafter.

This invention comprises the use of a cationic acid treated gelatinized waxy-type starch as a flocculating agent for primary sewage sludge.

DETAILED DESCRIPTION

Quaternary ammonium butene halide starch ethers possessing a greatly improved flocculating capacity can be prepared by reacting an acid treated gelatinized starch with a purified reaction product of dichlorobutene with a tertiary amine or tertiary amine salt. Although any amine may be used, we prefer to use the tertiary amines, since under the conditions used, they do not further react with halides to form a variety of products as do the primary and secondary amines, thereby reducing the yields and purity of the reagent. Trimethylamine appears to offer the most advantages of the tertiary amines, being economical and reacting well in this reaction. However, other tertiary amines can be used.

Hunt U.S. Pat. No. 3,624,070 discloses methods of preparing the amine butene halide reagent which is the same reagent used in this invention. This reagent is known as amine alkene halide salt and this term is understood to include quaternary ammonium alkene halide salts. The reagent is represented by the following structural formula:

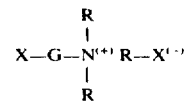

wherein X is halide, R is methyl or ethyl, and G is alkenylene of 2 to 4 carbons.

This product is reacted with gelatinized, acid treated waxy maize starch to produce the following product, an amine butene halide starch ether:

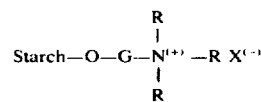

wherein X is halide, R is methyl or ethyl, and G is alkenylene of 2 to 4 carbons.

The starch reaction product of this invention differs from the starch reaction product of the U.S. Pat. No. 3,624,070 in that the starch is acid treated to a fluidity of 30 ml. to 50 ml.; it is reacted in a gelatinized condition rather than being reacted in granular form; and it requires a greater amount of amine butene halide reagent.

It is important to this invention that the starch be acid treated to exhibit a high fluidity and that the starch be gelatinized prior to adding amine butene halide. It also is important that the degree of substitution be within a specified range, and that a specific amount of the starch ether be added to the sludge.

As stated, the starch used in the present invention preferably is waxy maize or waxy-type starch.

The acid treatment preferably is with hydrochloric acid but can be with any other suitable mineral or organic acid capable of catalyzing the hydrolysis.

The waxy maize starch is acid treated to a fluidity of from 30 ml. to about 50 ml., preferably to a fluidity of about 40 ml., which is measured by the dry phase fluidity method. This acid treatment can be carried out by any suitable method, such as spraying the starch with the acid and then heating. Example No. 1 is a detailed description of making the acid treated waxy corn starch.

EXAMPLE NO. 1

A waxy maize starch slurry is made with about a 21° to about 24° Baume corrected to 60°F. The temperature of the slurry is raised to about 120° to about 130°F. and about 1.2% to about 1.6% by weight (based on the dry weight of the starch) hydrochloric acid is added to the slurry. The reaction is allowed to proceed for about 3 to about 7 hours or until the desired fluidity is achieved. The fluidity can be determined by the wet or dry phase fluidity methods. The starch is then neutralized to a pH of about 5.5 to about 6.5 and diluted with excess water to about 15° to about 19° Baume and filtered. The filtrate is reslurried to about 12° to about 15° Baume, filtered and dried.

After the starch is acid treated, it is gelatinized by any suitable method and then reacted with the amine butene halide (particularly 4-chloro-2-butenyltrimethylammonium chloride). From about 50 to 55% by weight (based on the dry weight of the starch) of the amine alkene halide is reacted with the acid treated gelatinized waxy maize corn starch for about 4 to abou5 5 hours at a temperature of about 65° to about 75°C. using the technique in the following Example No. 2. The final product has a degree of substitution (D.S.) of about 0.15 to about 0.25 with a fluidity of 30 to about 50 ml.

EXAMPLE NO. 2

In preparing the cationic starch, acid treated waxy corn starch of 37 fluidity is added to water in the proportion of 216 parts of starch (dry basis) to 600 ml. of water. From about 25 to about 30% by weight starch (dry basis) based on the combined weight of water and starch can be used. The acid treated starch is prepared as hereinbefore described.

The mixture is gelatinized with live steam at a temperature of about 212 to about 220°F. for a period of about 5 to about 10 minutes while being stirred.

The temperature is adjusted to 70°C. and the stirring continued. Then 64 parts of a 50% NaOH solution are added to the mixture of gelatinized starch and water with continued stirring. The NaOH is added as a catalyst and not as a gelatinizing agent. From about 12 to about 18% by weight NaOH based on the dry weight of the starch can be added. The temperature can be 65° to 75°C.

Next, 222 parts of a 50% solution of 4-chloro-2-butenyltrimethylammonium chloride is added. This reagent is prepared as hereinbefore described. The solution is allowed to react for 4 hours with stirring at 70°C. before it is diluted to 30% solids by weight to produce a gelatinized acid treated cationic starch.

From about 50 to about 55% by weight (based on the dry weight of starch) of the amine butene halide can be used. This reaction between the amine butene halide and the starch can continue for about 4 to about 5 hours at a temperature of about 65° to about 75°C.

About 0.007 to about 0.200% (based on the dry weight of the sludge) of this acid treated cationic starch is added to raw primary sludge. Preferably it is contacted with the sludge for a period of about 3 to about 5 minutes, but longer times are satisfactory. After the sludge is dewatered below about 70% moisture (by weight) it can be incinerated.

Following are examples of treating raw primary sewage with the cationic acid treated starch of this invention.

EXAMPLE NO. 3

This Example shows the comparison of a commercially available cationic polyelectrolyte and the product of this invention acting upon municipal primary sludge.

Evaluations were made comparing a commercially available cationic polyelectrolyte with the acid treated cationic starch prepared in Example No. 2. Also, to insure a negative charge is imparted to the sludge and that coagulation of the fines takes place, an anionic polyelectrolyte, Purifloc A-23, made by the Dow Chemical Company, is utilized in all of the experiments. This anionic polyelectrolyte is a very high molecular weight water soluble hydrolyzed polyacrylamide.

Composite samples of primary sludge were acquired from a municipal sewage treatment plant. A predetermined amount (based on the dry weight of the sludge) of a 0.05% by weight aqueous solution of an anionic polyelectrolyte, Purifloc A-23, is added to 200 ml. of raw primary sludge and mixed back and forth ten times between two beakers.

Then a predetermined amount (based on the dry weight of the sludge) of a 0.5% by weight aqueous solution of the commercial cationic polyelectrolyte is added to the sludge, mixed back and forth ten times between two beakers, and is transferred to a Buchner funnel fitted with Whatman No. 1 filter paper. The pressure on the filtrate receiver was reduced to 13 in. Hg and the filtrate collected after 30, 60, 90 and 120 seconds. The minimal quantities of polyelectrolytes required to increase solids to approximately 30% in 120 seconds was used as criteria for adequate flocculation and dewatering.

This same procedure is followed for the acid treated cationic waxy starch of Example No. 2 wherein a predetermined amount (based on the dry weight of the sludge) of a 2.0% by weight aqueous solution is added to the sludge.

The two polymer system (anionic and cationic) is used to first coagulate and thicken the fines and then flocculate the particles giving a rapid rate of filtration.

This comparison of cationic flocculating agents was made on 25 samples of raw municipal primary sludge and the results are seen in Table 1.

TABLE I

| Run | % Solids | % Anionic Polyelectrolyte Added[1] | % Commercial Cationic Polyelectrolyte Added[1] | % Cationic Waxy Starch Added[1] | % Solids After Filtration Commercial Polyelectrolyte | Starch of the Invention |
|---|---|---|---|---|---|---|
| 1 | 3.2 | 0.0078 | 0.469 | | 23.7 | |
|   | 3.2 | 0.0063 | | 0.100 | | 22.9 |
| 2 | 3.5 | 0.0078 | 0.371 | | 25.9 | |
|   | 3.5 | 0.0078 | | 0.100 | | 31.8 |
| 3 | 5.1 | 0.0098 | 0.45 | | 23.7 | |
|   | 5.1 | 0.0074 | | 0.147 | | 25.5 |
| 4 | 5.7 | 0.0219 | 0.263 | | 28.5 | |
|   | 5.7 | 0.0219 | | 0.070 | | 30.0 |
| 5 | 2.9 | 0.0126 | 0.207 | | 24.2 | |
|   | 2.9 | 0.0126 | | 0.100 | | 26.4 |
| 6 | 5.0 | 0.0175 | 0.200 | | 35.7 | |
|   | 5.0 | 0.0125 | | 0.100 | | 35.7 |
| 7 | 8.9 | 0.0124 | 0.174 | | 36.3 | |
|   | 8.9 | 0.0124 | | 0.067 | | 40.5 |
| 8 | 4.0 | 0.0125 | 0.045 | | 80.0 | |
|   | 4.0 | 0.0125 | | 0.025 | | 80.0 |
| 9 | 5.5 | 0.0250 | 0.027 | | 36.7 | |
|   | 5.5 | 0.0250 | | 0.009 | | 34.4 |
| 10 | 3.3 | 0.0189 | 0.303 | | 22.8 | |
|    | 3.3 | 0.0121 | | 0.145 | | 23.6 |
| 11 | 8.9 | 0.0421 | 0.045 | | 34.2 | |
|    | 8.9 | 0.0421 | | 0.011 | | 32.4 |
| 12 | 5.7 | 0.0526 | 0.088 | | 28.5 | |
|    | 5.7 | 0.0439 | | 0.049 | | 28.5 |
| 13 | 7.7 | 0.0250 | 0.130 | | 26.5 | |
|    | 7.7 | 0.0250 | | 0.052 | | 30.2 |
| 14 | 6.6 | 0.0454 | 0.027 | | 28.1 | |
|    | 6.6 | 0.0454 | | 0.015 | | 27.5 |
| 15 | 6.8 | 0.0404 | 0.015 | | 29.0 | |
|    | 6.8 | 0.0404 | | 0.007 | | 29.0 |
| 16 | 7.4 | 0.0405 | 0.014 | | 31.5 | |
|    | 7.4 | 0.0405 | | 0.007 | | 30.8 |
| 17 | 5.1 | 0.0314 | 0.108 | | 29.1 | |
|    | 5.1 | 0.0314 | | 0.039 | | 30.9 |
| 18 | 5.7 | 0.0250 | 0.070 | | 30.8 | |
|    | 5.7 | 0.0250 | | 0.035 | | 30.8 |
| 19 | 9.0 | 0.0250 | 0.233 | | 47.4 | |
|    | 9.0 | 0.0250 | | 0.050 | | 51.6 |
| 20 | 5.2 | 0.0336 | 0.269 | | 27.4 | |
|    | 5.2 | 0.0336 | | 0.100 | | 26.0 |
| 21 | 3.8 | 0.0197 | 0.263 | | 25.3 | |
|    | 3.8 | 0.0197 | | 0.100 | | 25.3 |
| 22 | 4.6 | 0.0163 | 0.326 | | 26.3 | |
|    | 4.6 | 0.0163 | | 0.119 | | 26.3 |
| 23 | 3.1 | 0.0161 | 0.161 | | 23.0 | |
|    | 3.1 | 0.0161 | | 0.081 | | 24.8 |
| 24 | 2.7 | 0.0139 | 0.259 | | 36.0 | |
|    | 2.7 | 0.0139 | | 0.100 | | 38.6 |
| 25 | 6.3 | 0.0278 | 0.222 | | 28.0 | |
|    | 6.3 | 0.0278 | | 0.100 | | 28.0 |
| Average | | | | | 31.5% | 32.5% |

[1]Based on the dry weight of the sludge

EXAMPLE NO. 4

The following example shows a plant size run using acid treated waxy maize cationic starch in which the starch is 40-fluidity and has a degree of substitution of 0.23 for the amine butene halide. The sewage treatment plant is a commercial operation and the sludge had an initial solids content of 8.5% by weight.

The cationic starch is added to the sludge as a 1.128% solution at a 0.1061% by weight basis (based on the dry weight of the sludge). The treated sludge has a solids content of 29.4%. On a dry solids basis, 2.125 pounds of cationic starch were added per ton dry sludge recovered.

EXAMPLE NO. 5

The following example shows a plant size run using acid treated waxy maize cationic starch in which the starch is 40-fluidity and has a degree of substitution of 0.22 for the amine butene halide. The sewage treatment plant is a commercial operation and the sludge had an initial solids content of 10.0% by weight.

The cationic starch is added to the sludge as a 1.128% solution at a 0.0861% by weight basis (based on the dry weight of the sludge). The treated sludge has a solids content of 34.8%. On a dry solids basis, 1.722 pounds of cationic starch were added per ton dry sludge recovered.

EXAMPLE NO. 6

The following example shows a plant size run using acid treated waxy maize cationic starch in which the starch is 40-fluidity and has a degree of substitution of 0.22 for the amine butene halide. The sewage treatment plant is a commercial operation and the sludge had an initial solids content of 6.8% by weight.

The cationic starch is added to the sludge as a 1.128% solution at a 0.0926% by weight basis (based on the dry weight of the sludge). The treated sludge had a solids content of 26.8%. On a dry solids basis, 1.852 pounds of cationic starch were added per ton dry sludge recovered.

EXAMPLE NO. 7

This example shows the dewatering capabilities of a dual polymer system in the vacuum filtration of municipal raw primary sludge. Evaluations were made using the acid-treated cationic starch of this invention in combination with a synthetic anionic polyelectrolyte. The polyelectrolyte used was Atlasep 3A3 manufactured by ICI America, Incorporated. It is an ultra-high molecular weight (over 10 million) synthetic polyelectrolyte (hydrolyzed polyacrylamide copolymer salt) with moderate anionic character. This product is typical of anionic polyelectrolytes which are readily available articles of commerce.

Composite samples of municipal raw primary sludge were acquired from a municipal sewage treatment plant. A predetermined amount (based on the dry weight of the sludge) of a 0.05% by weight aqueous solution of the anionic polyelectrolyte, Atlasep 3A3, is added to 2,000 ml. raw primary sludge and agitated. Then a predetermined amount (based on the dry weight of the sludge) of a 0.5% by weight aqueous solution of the cationic starch of this invention is added to the sludge and agitated being sure not to deflocculate the solids. The starch is of 61 ml. wet phase fluidity and has a degree of substitution of 0.25. It is 4-chloro-2-butenyltrimethylammonium chloride. A filter leaf at 13 in. Hg is suspended in the conditioned sludge for 60 seconds and then allowed to air dry under vacuum for another 180 seconds. Results obtained are in Table II.

b. reacting the gelatinized starch with an amine butene halide, and c. recovering a product having a degree of substitution of about 0.15 to about 0.25 and a formula as follows:

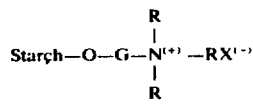

wherein X is halide, R is methyl or ethyl, and G is alkenylene of 2 to 4 carbons.

2. The method of claim 1 wherein the starch is waxy maize starch.

3. The method of claim 1 wherein the amine butene halide is 4-chloro-2-butenyltrimethylammonium chloride.

4. The method of claim 1 wherein the starch is waxy maize and treated to a fluidity of about 30 to 50 ml., the amine butene halide is 4-chloro-2-butenyltrimethylammonium chloride, and the starch ether has a degree of substitution of about 0.15 to 0.25.

5. An acid treated gelatinized starch amine butene halide having a fluidity of about 30 to about 50 ml., a degree of substitution of amine butene halide is about 0.15 to about 0.25, and a formula as follows:

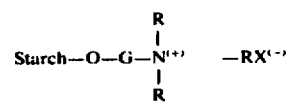

TABLE II

| Run | % Solids | % Anionic Polyelectrolyte Added | % Cationic Polyelectrolyte Added | % Solids After Filtration | lb./ft.²/hr. Yield |
|---|---|---|---|---|---|
| 1 | 6.4 | 0.022 | 0.055 | 26.8 | 5.10 |
| 2 | 4.0 | 0.016 | 0.056 | 19.5 | 2.15 |
| 3 | 4.1 | 0.022 | 0.055 | 24.3 | 3.81 |
| 4 | 5.9 | 0.022 | 0.055 | 37.4 | 6.78 |
| 5 | 5.5 | 0.022 | 0.055 | 37.7 | 4.58 |
| 6 | 0.9 | 0.022 | 0.055 | 25.6 | 1.56 |
| 7 | 8.4 | 0.022 | 0.055 | 31.7 | 4.32 |

What is claimed is:

1. A method of making a gelatinized cationic starch ether comprising the steps of
   a. gelatinizing an acid-treated starch having a degree of fluidity of about 30 to about 50 ml., wherein X is halide, R is methyl or ethyl, and G is alkenylene of 2 to 4 carbons.

6. The product of claim 5 wherein the amine butene halide is 4-chloro-2-butenyltrimethylammonium chloride.

* * * * *